2 Sheets—Sheet 1.

P. F. FLEMING.
HORSE HAY-RAKE.

No. 185,169. Patented Dec. 12, 1876.

WITNESSES
Phil. W. Hale,
D. P. Howe

INVENTOR
Peter F. Fleming,
per Wm Beale Hale,
Attorney.

THE GRAPHIC CO. N.Y.

2 Sheets—Sheet 2.

P. F. FLEMING.
HORSE HAY-RAKE.

No. 185,169. Patented Dec. 12, 1876.

WITNESSES
Phil. W. Hale,
D. P. Towe

INVENTOR
Peter F. Fleming,
per Wm Beale Hale,
Attorney.

THE GRAPHIC CO. N.Y.

UNITED STATES PATENT OFFICE.

PETER F. FLEMING, OF SALISBURY, MISSOURI.

IMPROVEMENT IN HORSE HAY-RAKES.

Specification forming part of Letters Patent No. 185,169, dated December 12, 1876; application filed August 29, 1876.

*To all whom it may concern:*

Be it known that I, PETER F. FLEMING, of Salisbury, in the county of Chariton and State of Missouri, have invented certain new and useful Improvements in Sulky-Rakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
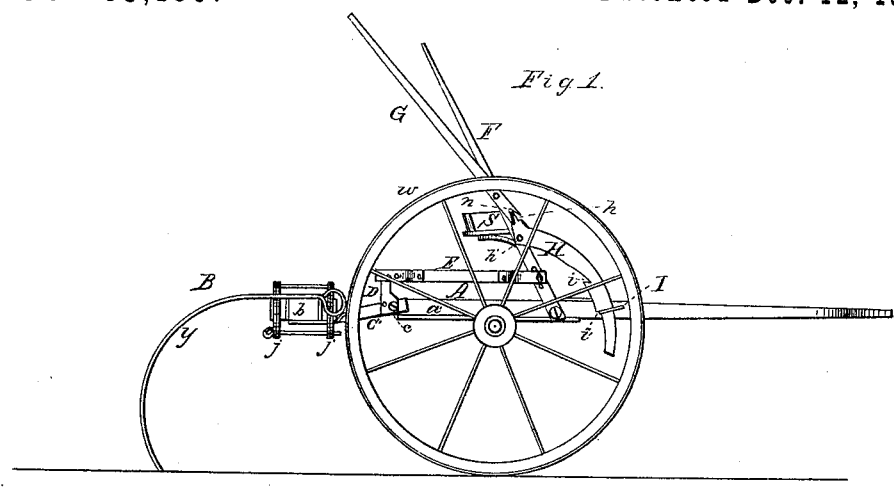
Figure 2:
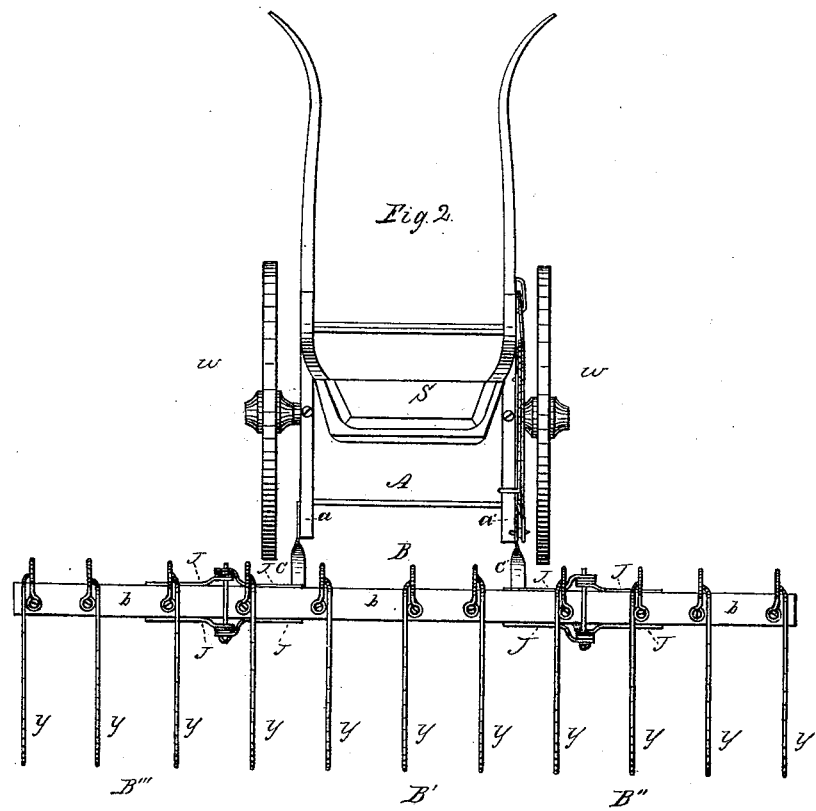
Figure 3:
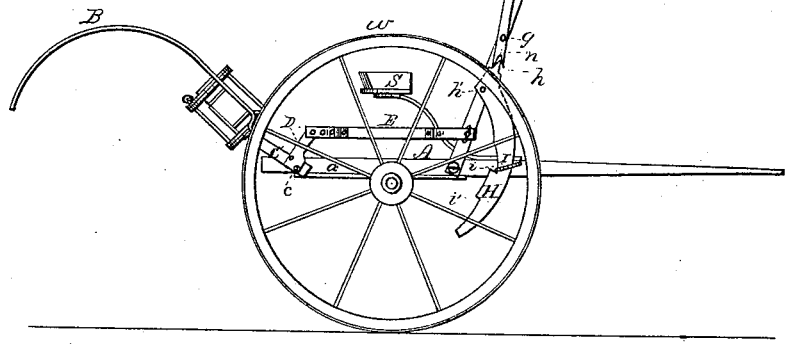
Figure 4:
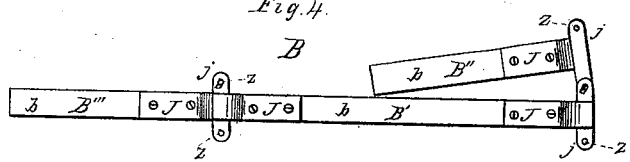
Figure 5:
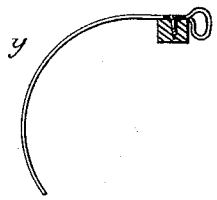

Figure 1 is a side elevation of my invention in position for use in the field. Fig. 2 is a plan view. Fig. 3 is a side view, showing the rake raised from the ground. Fig. 4 is a detached view of the folding rake-head; Fig. 5, a detached view of a rake-tooth.

A is the body of a sulky, in the rear of which, and immediately behind the wheels $w$ $w$, is located the sectional folding rake B, the center section B' of which is connected to the side timbers $a$ $a$ of the body A by means of bars C C', which are rigidly attached to the rake-head, but are pivoted to the side timbers of the sulky at $c$ $c$. A short arm, D, projects upward from the bar C', (which is on the right-hand side of the sulky,) near its pivoted end, and from the top of this short arm D a connecting-rod, E, extends forward, and is pivoted to a lever, F, which is pivoted to the side timber $a'$, and extends upward alongside the seat S. When the upper end of lever F is moved forward it will readily be seen that the rake will be raised by the action of the connecting-rod E, short arm D, and bar C'. To the outer side of lever F, and about its middle, is pivoted a lever, G, which extends upward from the pivot $g$ to the top of lever F, but extends only a short distance below said pivot. In the bottom of lever G is cut a notch, $n$. An arc or curved iron-bar, H, having its upper end shaped to a point, $h$, is pivoted to lever F at $h'$, so that its point $h$ projects into the notch $n$ in the bottom of lever G. This arc H curves forward and downward, and passes through a loop, I, fixed in the side timber $a'$. On the inner curved edge of bar H are formed two notches, $i$ $i'$, or catches, the upper of which, $i$, by catching under the rear side of loop I, will prevent bar H from moving upward; and the lower of said catches, $i'$, by catching over the rear side of said loop, will prevent said bar from moving downward. The office of the lever G, curved notched bar H, and loop I is to retain the rake in position after it has been raised or lowered by lever F, and to allow the rake to be readily changed from one position to the other by the driver without leaving his seat. For instance, in Fig. 1 the implement is shown in position for work in the field. The rake is lowered to the ground, and the lever F inclined rearward. The lever G inclines still farther to the rear, in which position it falls by its over weight. The lower notch or catch $i'$ of the curved bar H is caught over the rear side of loop I, and thus prevents the lever F from being jolted forward or the rake raised. Now, when it is desired to raise the rake from the ground, the driver moves the lever G forward to the position shown in dotted lines, and the action of the notch $n$ on the point $h$ causes the curved bar H to be thrown outward against the front side of loop I, as also shown in dotted lines. The lever F may now be moved forward to raise the rake, as shown in Fig. 3, and the lever G being pulled slightly backward, the curved bar H is thrown to the rear side of loop I, and catch $i$ takes under said loop and holds the parts in position.

As before stated, the center section B' of the rake is connected with the sulky-body by bars C C'. To the ends of this center section of the rake are attached two other sections, B" B''', by means of peculiar hinges, which I will now describe. J J, &c., are metal straps, firmly attached to the sections $b$ $b$ $b$ of the rake-head. Near the ends of said sections the straps J J expand, and have cross-heads $j$ $j$ attached to their extremities. In each end of said cross-heads are bolt-holes $z$ $z$. The cross-heads of one section fit between those of an adjoining section, and bolts or pins passed through the holes $z$ $z$ secure the parts together.

When it is desired to fold the rake or either section, as shown in Fig. 4, the pin or bolt is removed from the holes in the lower ends of the cross-heads, and a section turned up on the other or upper pin, as a pivot, as shown in Fig. 4.

The curved rake-teeth y y, &c., are made of iron or steel, and in order to give them increased elasticity they are attached to the top of the rake-head, so as to project forward, and are then bent downward and back over the rake-head, as shown in Fig. 5, and thence curve downward to the rear.

The sections of the folding rake may be made of any desired length. In traveling on the road I usually fold up both end sections; but in working either one or both, or neither, may be folded, so as to make a wide or narrow rake, as desired.

By removing the pivot-bolts c c, and the pivot at lower end of lever F, the rake may be entirely detached from the sulky, which may then be used for ordinary travel.

Having now fully described my invention, and explained the operation thereof, I claim—

1. The combination of lever F, rod E, arms D and C, lever G, curved notched bar H, and loop I, substantially as set forth.

2. The combination of levers F and G, curved notched bar H, and loop I, substantially as described.

3. The section-hinge, consisting of straps J J, cross-heads j j, and the connecting-pins, one of which serves as a pivot and the other as a lock.

In testimony that I claim the foregoing as my own I affix hereto my signature in presence of two witnesses.

PETER F. FLEMING.

Witnesses:
ELI WAYLAND,
JAS. M. GUNN.